(12) United States Patent
Ledbetter et al.

(10) Patent No.: US 8,390,975 B1
(45) Date of Patent: Mar. 5, 2013

(54) PORTABLE MOTORIZED FRAME REMOTE RACKING TOOL

(76) Inventors: Ashley Sue Ledbetter, Argyle, TX (US); Finley Lee Ledbetter, Argyle, TX (US)

( * ) Notice: Subject to any disclaimer, the term of this patent is extended or adjusted under 35 U.S.C. 154(b) by 169 days.

(21) Appl. No.: 13/047,368

(22) Filed: Mar. 14, 2011

Related U.S. Application Data

(63) Continuation-in-part of application No. 12/784,673, filed on May 21, 2010, now Pat. No. 8,164,875.

(51) Int. Cl.
*H02H 3/18* (2006.01)
(52) U.S. Cl. .......................................... 361/115; 361/79
(58) Field of Classification Search .................... 361/79, 361/115; 307/31, 64
See application file for complete search history.

(56) References Cited

U.S. PATENT DOCUMENTS

| | | | |
|---|---|---|---|
| 5,397,869 A | 3/1995 | Huen | |
| 5,465,031 A | 11/1995 | Nilssen | |
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 2003/0200648 A1* | 10/2003 | Greer | 29/622 |
| 2005/0194243 A1 | 9/2005 | Prineppi | |

* cited by examiner

*Primary Examiner* — Danny Nguyen
(74) *Attorney, Agent, or Firm* — Gardere Wynne Sewell LLP

(57) ABSTRACT

A portable motorized racking tool for installing, removing, and testing electrical equipment is disclosed herein. The portable motorized racking tool can be used to operate upon electrical equipment from a remote location outside of an arc flash zone. Also disclosed is a method of use of the portable motorized racking tool.

19 Claims, 10 Drawing Sheets

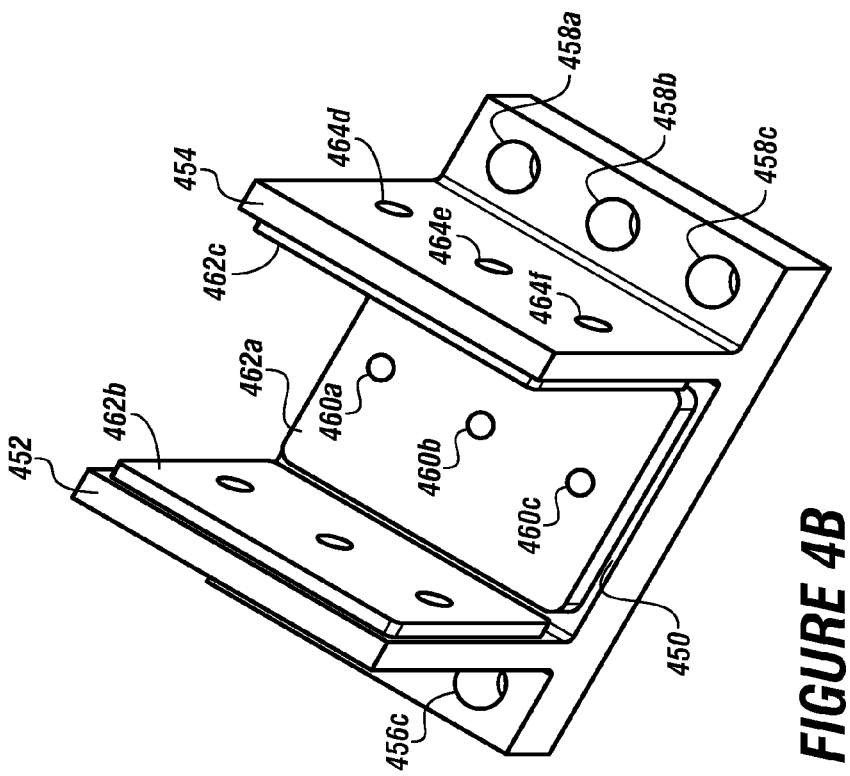
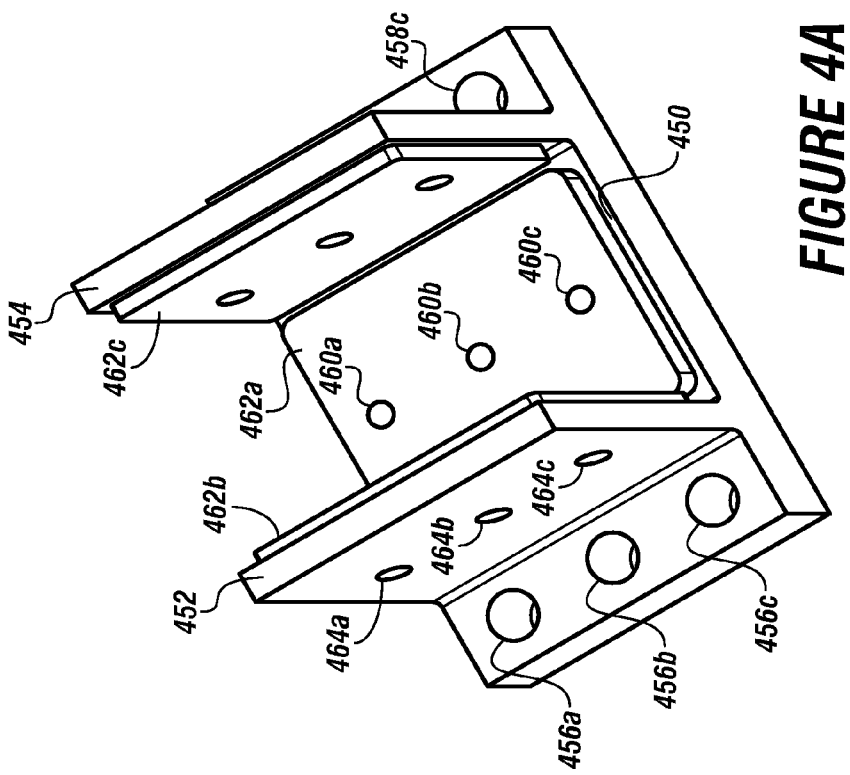
FIGURE 4B
FIGURE 4A

PORTABLE MOTORIZED FRAME REMOTE RACKING TOOL

CROSS REFERENCE TO RELATED APPLICATIONS

The present application is a continuation-in-part of co-pending U.S. patent application Ser. No. 12/784,673 filed on May 21, 2010, entitled "PORTABLE MOTORIZED FRAME REMOTE RACKING TOOL", which is incorporated herein in its entirety.

FIELD

The present embodiments generally relate to a framed portable motorized racking tool for removing and/or installing electrical equipment surrounded by a metal surface that can be operated by a user outside of an arc flash zone.

BACKGROUND

A need exists for a remotely operable battery powered portable motorized racking tool that can magnetically secure to metal around an insulated case circuit breaker or the like.

A further need exists for a racking tool that can be used with switch gear housings for circuit breakers without requiring attachment to a wall outlet.

The present embodiments meet these needs.

BRIEF DESCRIPTION OF THE DRAWINGS

The detailed description will be better understood in conjunction with the accompanying drawings as follows:

FIGS. 4A-4B depict a sliding motor bracket.

Figure 1:
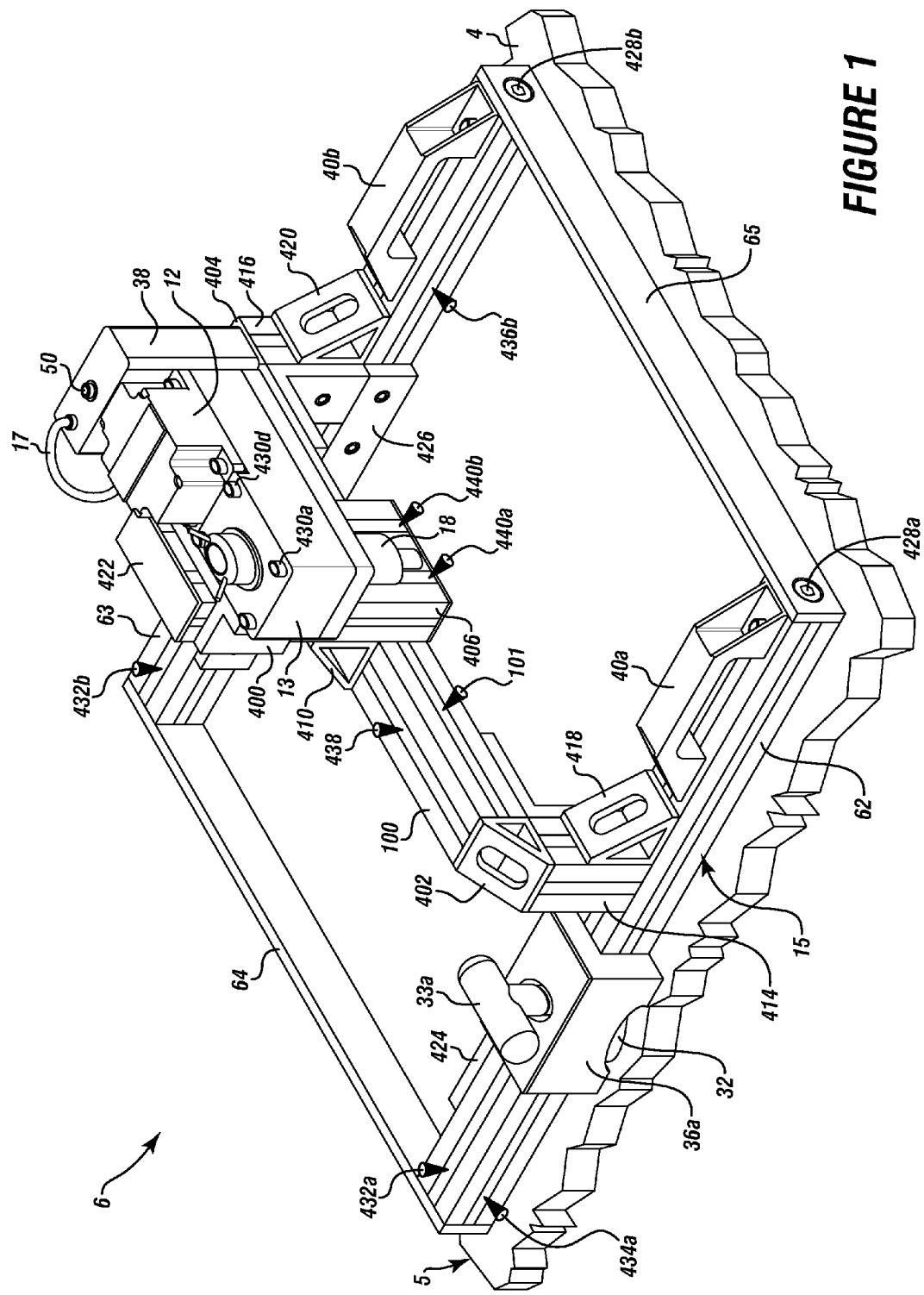
FIG. 1 depicts a perspective top view of a portable motorized racking tool.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments, and that the embodiments can be practiced or carried out in various ways.

The present embodiments relate to a framed robot or portable motorized racking tool for installing or removing electrical equipment within a hazardous arc flash zone.

The portable motorized racking tool can be used on all frame sizes of PZ 4/NW MASTERPACT™ switch gear housings for circuit breakers made by Schneider Electric of Palatine, Ill., and the like.

The portable motorized racking tool can be particularly versatile because it can be resized and used with an interchangeable clutch and coupling. Each interchangeable clutch and coupling can be preset and sized at a manufacturing size, such that no training or specialized knowledge is needed by an operator to change the clutches and couplings. As such, the operator need only determine whether a large clutch or coupling, or a small clutch or coupling is needed, and then the operator can operate the portable motorized racking tool to install or remove the electrical equipment.

The portable motorized racking tool can be lightweight and low cost to ship, as the frame can be entirely formed from aluminum. In embodiments, the frame can be made from hollow aluminum bars.

The portable motorized racking tool can have a width from about 8 inches to about 24 inches, a height from about 6 inches to about 30 inches, a depth from about 3 inches to about 8 inches, and can weigh less than 80 pounds.

The electrical equipment that can be operated upon using the portable motorized racking tool can include low voltage circuit breakers using up to 1000 volts, medium voltage circuit breakers using from 1000 volts to 20000 volts, switch gears, motor control centers, or contactors.

The electrical equipment can be surrounded by a metal surface or another magnetic surface, such that the portable motorized racking tool can be magnetically engaged with the metal surface.

Using the portable motorized racking tool can allow an operator to remain outside of the arc flash zone during operation, thereby safely remaining away from immediate dangers. For example, operators can typically be located from about 10 feet to about 25 feet away from the circuit breaker or the electrical equipment being installed, removed, or tested. As such, the portable motorized racking tool can reduce a facility's need to buy heavy protective equipment, such as heavy arc flash suits, which are hot and known to cause heart attacks in wearers. Furthermore, the portable motorized racking tool can reduce liability to facilities because the operator can spend less time in an arc flash suit, and can remain away from danger.

For example, operators in chemical plants, hospitals, hotel electrical rooms, and other such electrical areas with switch gear and circuit breakers can operate on a circuit breaker from a safe distance.

The operator can track the amps required to rack each circuit breaker or switch gear by using a current controller in a remote switch operator to document operation. In doing so, the operator can predict the amperage needed to install or remove a particular circuit breaker. The predictive ability enables the operator to target circuit breakers that are higher in amps than other switch gears, and to take additional protective steps while operating on those circuit breakers.

In one or more embodiments, the operator can stand behind a shield or other device and be protected from both fire and explosion of an arc flash while using the portable motorized racking tool. The operator can operate the portable motorized racking tool from a distance away using the remote switch operator, which can provide both control signals and power, and can be operated by a hand held remote controller by the operator.

The portable motorized racking tool can have a frame. The frame can be made of aluminum. The frame can be square, rectangle, angular, or circular.

The frame can include a first side support and a second side support opposite the first side support. The first and second side supports can be rectangular structural members. The side supports can be made of smooth plates, such as rigid aluminum plates or stainless steel plates, and can be thin, such as from about 1/32 of an inch to about 1/2 of an inch thick. The first and second side supports can be the same length.

The side supports can be configured to resist deforming when supporting components. For example, the side supports can be strong enough to resist deforming when the frame is dropped from a height of about six feet onto concrete or another hard surface.

A first beam can be disposed between the first side support and the second side support, and a second beam can be disposed between the first side support and the second side support opposite the first beam. The beams can be fastened or welded to the side supports.

The beams and side supports can each have two channels per side to facilitate fastening components thereto. All components engaged within the channels can be held within the perimeter of the frame, providing a safe and small footprint device with no harmful projecting components.

In one or more embodiments, the beams can be from about 12 inches to about 24 inches in length, from about 1 inch to about 4 inches in width, and can be made of a hollow aluminum channel.

The frame can have a first stop connected to the first side support, and a second stop connected to the second side support.

The frame can have a bar mounted between the first stop and the second stop. The bar can be a rectangular structural member substantially similar to the side supports. The bar can span from the first side support to the second side support. The bar can provide rigidity to the frame during use and can support additional components within the perimeter of the frame.

In one or more embodiments, the bar can be secured parallel to the side supports, and can be adjustably and removably connected to the first beam and the second beam. The bar can connect to the channels of the beams for quick release and reconfiguration for different sized switch gears or larger motors. Also, the channels of the beams can be used to adjustably engage each side support, allowing for quick change outs of equipment, enhancing the versatility and flexibility of the portable motorized racking tool.

The bar can be made of a lightweight strong material with at least one channel in each of the four sides of the bar. The channels can be used to removably fasten components to the bar, enabling for fast maintenance or reconfiguration of the frame when different parts are needed.

In one or more embodiments, the first beam, the second beam, the first side support, and the second side support can all be made of aluminum. The first beam, the second beam, the first side support, and the second side support can be hollow.

The frame can have at least one handle mounted thereto for ease of movement and placement of the portable motorized racking tool. The handle can be slidingly engaged in one or more channels of the frame, such as channels on the side supports.

The portable motorized racking tool can have a motor arm that can extend perpendicular from the bar. The motor arm can be supported by a first gusset and a second gusset, which can connect between the motor arm and the bar. The first gusset and the second gusset can be slidingly engaged within channels on the first and second stops, as well as channels on the bar. The motor arm can be a rectangular structural member substantially similar to the side supports. The motor arm can have a cover disposed over a top of the motor arm opposite the bar.

A locking device can be disposed on the motor arm. The locking device can be configured to operatively engage a spring to apply pressure to maintain a connection between a coupling and the electrical equipment to be operated upon. For example, the locking device can be a thumb screw, and in operation a user can twist the locking device in order to engage the spring, which can apply pressure to the coupling engaged with the electrical equipment.

A sliding motor bracket can be connected to the motor arm, such as with fasteners. The sliding motor bracket can be configured to maintain the coupling with the electrical equipment at a predetermined distance from the frame. For example, the sliding motor bracket can be slidingly engaged on the motor arm, and connected to a motor with a gear assembly engaged with the coupling. The sliding motor bracket can slide upwards and downwards along a length of the motor arm to adjust the coupling to be at the predetermined distance.

In one or more embodiments, the motor arm can have one or more channels within which the sliding motor bracket can be slidingly engaged.

In one or more embodiments, the sliding motor bracket can include a sliding motor bracket back, a sliding motor bracket first side wall connected to the sliding motor bracket back, a sliding motor bracket second side wall connected to the sliding motor bracket back, a plurality of first mounting holes disposed in the sliding motor bracket back, a plurality of second mounting holes disposed in the sliding motor bracket back opposite the plurality of first mounting holes, and a plurality of third mounting holes disposed in the sliding motor bracket back between the sliding motor bracket first side wall and the sliding motor bracket second side wall.

A first insert can be disposed on the sliding motor bracket back between the sliding motor bracket first side wall and the sliding motor bracket second side wall.

A second insert can be disposed on the sliding motor bracket first side wall adjacent the first insert.

A third insert can be disposed on the sliding motor bracket second side wall adjacent the first insert.

A plurality of insert mounting holes can be disposed in the sliding motor bracket first side wall and the sliding motor bracket second side wall.

The plurality of insert mounting holes can be configured to receive fasteners to hold the first insert, the second insert, and the third insert to the sliding motor bracket. The inserts can have mounting holes that correspond to the plurality of insert mounting holes on the sliding motor bracket.

In one or more embodiments, the first insert, the second insert, and the third insert can each be a one-piece C-shaped structure made of a polyamide, a non-deforming plastic, a TEFLON™ coated material configured to provide a frictionless engagement, a coated graphite liner configured to provide a non-tearing frictionless engagement, NYLON™, or the like.

A first magnetic support can be slidably attached to the first side support, and a second magnetic support can be slidably attached to the second side support. For example, the side support can have one or more channels within which the magnetic supports can be slidingly engaged. The magnetic supports can be engaged with the bar and the first and second stops to provide support thereto. The magnet supports can be made of aluminum.

At least one removable magnetically shielding magnet housing can be connected to the magnetic support. Each removable magnetically shielding magnet housing can be slidingly engaged within one or more of the channels of the side supports. Each removable magnetically shielding magnet housing can be one made by Magswitch of Colorado.

Each removable magnetically shielding magnet housing can have an extendable and retractable magnet with a magnet handle disposed therein. The extendable retractable magnet can be a non-electric magnet.

The magnet handle can be rotated to extend and retract the extendable and retractable magnet. The extendable and retractable magnet can be configured to magnetically connect the frame to the metal surface surrounding the electrical equipment. For example, the frame can be disposed over the metal surface, and the magnet handles can be rotated to extend the extendable retractable magnets to engage the metal surface; thereby attaching the portable motorized racking tool to the metal surface.

Each removable magnetically shielding magnet housing can provide magnetic shielding on five sides, such as on four connected sides and a top side of the removable magnetically shielding magnet housing.

A shaft of the magnet handle can pass through a shaft hole in the top side to connect with the extendable retractable magnet. In one or more embodiments, the magnet handle can engage the spring of the locking device, which can push the extendable retractable magnet at least a portion of the way out of the removable magnetically shielding magnet housing, thereby enabling the frame to attach to the metal surface around the switch gear or circuit breaker being installed, removed, tested or otherwise serviced.

The motor can have or be engage with a gear box. The motor can be in communication with a motor control housing, such as through a signal and power cord. The motor control housing can have an interface plug in communication with a remote switch operator or other power source for receiving power and control signals therefrom.

A rotatable shaft can be engaged with a shaft housing of the gear box. The rotatable shaft can have a key in a shaft keyway. The key can be engaged with a gear box keyway in the shaft housing. The key and gearbox keyway components can enable the operator to replace the rotatable shaft easily and quickly when needed.

The rotatable shaft can be a solid metal rod with a diameter from about 2 inches to about 8 inches, and can fit within the gear box. The rotatable shaft can be a hollow metal rod surrounded by an insulator, such as a plastic or a urethane.

A torque limiting clutch can be connected to the rotatable shaft and to the coupling. In one or more embodiments, a clutch can be removable and interchangeable with the rotatable shaft.

The combination of the key and the shaft keyway, along with the shaft housing and the gear box keyway can form an easily detachable but secure locking mechanism.

An alignment tool can be engaged with the rotatable shaft. The alignment tool can be configured to rotate the coupling to align the coupling with the electrical equipment. In one or more embodiments, the alignment tool can have at least one wing configured to rotate the rotatable shaft to provide alignment. For example, the rotatable shaft can be engaged through the gear box within the shaft housing, and the alignment tool can engage with the shaft housing and/or the rotatable shaft for rotating the rotatable shaft. The rotatable shaft can thereby rotate the coupling to align the coupling with a portion of the electrical equipment, such that the coupling can operatively engaged the portion of the electrical equipment. As such, the motor can be used to rotate the coupling using the gear box; thereby rotating the portion of the electrical equipment for installing and/or removing the portion of the electrical equipment.

In one or more embodiments, the frame can have one or more gussets to provide support to portions of the portable motorized racking tool. The frame can have a third gusset connected to the first stop and the bar, a fourth gusset connected to the second stop and the bar, a fifth gusset connected to the first stop and the first side support, and a sixth gusset connected to the second stop and the second side support.

The gussets can adjustably engage channels on the beams, side supports, stops, and bar, and can be fastened thereto. The gussets can reinforce the frame and reduce vibration.

One or more embodiments can include a camera with a light in communication with a monitor, allowing for remote viewing by a user of the operation of the portable motorized racking tool.

The camera can capture images and/or video, and can transmit the captured images and/or video to the monitor for remote viewing. The camera can provide a digital image that has a dpi of 800×520. The light can include light emitting diodes to illuminate the viewing area of the camera.

The camera can be a battery powered magnetically mountable portable camera that can be positioned on the frame and connected wirelessly or in a wired configuration to the monitor.

The operator can view the install, test, or removal operation from a different room or another location away from the hazardous arc flash zone, while simultaneously and remotely operating the portable motorized racking tool using the remote switch operator.

The camera can have a magnetic mounting and can be used to monitor the rotations, allowing for continuous supervision of the coupling from a remote location.

A client device, such as a cell phone connected to a cellular network or a laptop connected to the Internet, can be in communication with the camera.

The remote switch operator can be used to remotely operate and power the portable motorized racking tool.

The remote switch operator can have a body hinged with a closable lid, such in a generally watertight configuration.

The remote switch operator can provide signals and power without requiring cords to be attached to a wall outlet of a facility, which can create a tripping hazard. The power can be DC 12 volt power.

The signals can include: install, remove, on, off, increase rotation speed, and decrease rotation speed. The rate of rotation can be displayed to the operator using the remote switch operator.

The remote switch operator can have a rugged, water-resistant, and impact-resistant housing, such as a sturdy plastic or urethane based housing.

The remote switch operator can be controlled by the operator using a wireless connection to a remote controller, or using a wired connection from the remote controller to the housing of the remote switch operator.

A first face plate can be disposed within the body, and can have a power plug, an install momentary push button, a remove momentary push button, an on-off switch, and a circuit breaker. A charger power supply can be connected to the power plug.

A circuit board can be disposed beneath the first face plate and engaged with two relays. The two relays can be engaged with at least one battery. The at least one battery can be connected to a battery charger through the power plug for receiving power from a power source to charge the at least one battery. The circuit board can include a microprocessor with a flash memory and computer instructions to monitor current.

A second face plate can be disposed within the housing adjacent the first face plate, and can include a current controller. The current controller can be in communication with at least one of the two relays. An interface cable can be configured to send and receive signals between the current controller and a transmitter/receiver in the body.

A remote controller can be in communication with the transmitter/receiver for remotely actuating the remote switch operator; thereby actuating the portable motorized racking tool. The remote controller can have an antennae, an on switch, an off switch, an install switch, a remove switch, and an automatic shut off switch.

The current controller can include a current controller circuit board with at least four engagement positions including: up, down, install, and remove. The current controller can also include at least one digital display.

The current controller can have a memory means, such as a flash drive. Computer instructions in a flash drive of the current controller can compare data supplied by the motor to a predetermined threshold installed in the current controller flash drive. Computer instructions can instruct the microprocessor on the circuit board to automatically shut off the portable motorized racking tool when a preset amperage is exceeded.

In one or more embodiments, the motor control housing can be configured to communicate with the relays of the remote switch operator. The motor control housing can include a motor control circuit board configured to operate the motor and the gear box using the signal and power cord.

One or more embodiments relate to a method for racking electrical equipment. The method can be implemented using the portable motorized racking took described herein.

The method can include providing communication between a portable motorized racking tool and a remote switch operator having a current controller. The communication can be provide through a cable, wirelessly, or combinations thereof.

The method can include attaching a first end of a torque limiting clutch to a rotatable shaft in the gear box of the portable motorized racking tool.

The method can include inserting a coupling into a second end of the torque limiting clutch.

The method can include setting the current controller on the remote switch operator to a predetermined amperage setting.

The method can include aligning the coupling with the electrical equipment that needs maintenance, removal, or installation, such as by rotating the alignment tool to rotate the coupling.

The coupling can be aligned simultaneously while attaching the frame to a metal surface adjacent the electrical equipment using at least one extendable and retractable magnet.

The frame can be attached by using the handles of the frame to engage the frame with the metal surface, and then rotating the magnet handle to engage the extendable and retractable magnet with the metal surface.

The method can include using a remote controller outside the perimeters of the arc flash zone.

The remote controller can cause the remote switch operator to flow signals and power into an interface plug on the portable motorized racking tool.

The method can include flowing power and control signals from the remote switch operator to power and control the motor and the gear box, and to rotate the rotatable shaft at the predetermined amperage setting.

For example, the user can push one or more buttons on the remote switch operator to initiate installation, removal, or other such actions. The remote switch operator can transmit signals associated with the pushed buttons to the motor control housing.

The motor control housing can transmit the signals to the motor through the signal and power cord. The motor can operatively engage the gear box to initiate rotation of the rotatable shaft, and thereby to initiate rotation of the coupling and of the portion of the electrical equipment engaged with the coupling.

For example, the portable motorized racking tool can turn the coupling in a first direction to install the piece of equipment, or turn the coupling in a second direction to remotely remove the piece of electrical equipment. As such, the portion of the electrical equipment can be installed or removed.

Using the portable motorized racking tool to install a circuit breaker or other piece of electrical equipment can include using the motor to turn the rotatable shaft clockwise with the clutch and coupling to allow the electrical equipment to travel to a first test position.

The motor can continue rotating the rotatably shaft in the clockwise direction, thereby completing the install of the electrical component.

Using the portable motorized racking tool to remove a circuit breaker or other piece of electrical equipment can include using the motor to operate the gear assembly in a reverse direction, or a counterclockwise direction, to turn the rotatable shaft counterclockwise with the clutch and coupling to allow the electrical equipment to travel to the first test position.

The motor can continue rotating the rotatably shaft in the counterclockwise direction, thereby completing the removal of the electrical component.

Using the portable motorized racking tool to test a circuit breaker or other piece of electrical equipment prior to installation can include using the motor to operate the gear assembly in the clockwise direction to the first test position, then the using motor to rotate the gear assembly counterclockwise to remove the circuit breaker or other piece of electrical equipment if the test fails.

During operation of the portable motorized racking tool for installation, removal, or testing, the operator can view the circuit breaker or electrical equipment from about six feet to about twenty feet away from the portable motorized racking tool.

Turning now to the Figures, FIG. 1 is a perspective top of the portable motorized racking tool 6. The portable motorized racking tool 6 can be used to remove or install electrical components for electrical equipment 5 surrounded by a metal surface 4.

The portable motorized racking tool 6 can include a frame 15. The frame 15 can include a first side support 62 and a second side support 63 opposite the first side support 62.

The first side support 62 and second side support 63 can each have a length from about 18 inches to about 24 inches, a width from about 1 to about 2 inches, and a thickness from about ⅛ of an inch to about ½ of an inch. The first and second side supports 62 and 63 can be made of hollow aluminum beams with at least one channel formed in each side of the hollow aluminum beams.

A first beam 64 can connect between the first side support 62 and the second side support 63. A second beam 65 can connect between the first side support 62 and the second side support 63 opposite the first beam 64.

In one or more embodiments the first and second beams 64 and 65 can be engaged with the first side support 62 and the second side support 63 using one or more frame fasteners, such as frame fasteners 428a and 428b.

The first beam 64 and second beam 65 can each have a length from about 18 inches to about 24 inches, a width from about 1 to about 2 inches, and a thickness from about ⅛ of an inch to about ½ of an inch. The first and second beams 34 and 65 can be made of hollow aluminum.

A first stop 414 can be connected to the first side support 62, a second stop 416 can be connected to the second side support 63, and a bar 100 an be mounted between the first stop 414 and the second stop 416.

The first and second stops 41 and 416 can be made of the same material as first beam 64, and can have a length ranging from about 1 inch to about 4 inches.

The bar 100 can be made of the same material as the first beam 64, and can have at least one channel on each side. The bar 100 can be from about 6 inches to about 12 inches in length.

A motor 12 can be connected to a gear box 13. The motor 12 can be one made by Oriental Motor USA Corp. of Los Angles, Calif., model number BLH5100K, which is a 24 volt motor, or another motor. Both the motor 12 and the gear box 13 can be connected to a motor arm 406 by a sliding motor bracket 400.

In one or more embodiments, one or more fasteners 430a and 430d can be used to secure the motor arm 406 to the motor 12 and/or the gear box 13.

The motor arm 406 can be from about 4 inches to 8 inches in length and from about 3 inches to about 6 inches wide. The motor arm 406 can be made of the same channel aluminum bars as the first side support 62. The motor arm 406 can have one or more top motor arm channels 440a and 440b.

The motor arm 406 can connect to the bar 100 with a first gusset 410, and can have a cover 422 on one end. For example, the first gusset 410 can slidingly engage with a bar front channel 438. The bar 100 can also have a bar side channel 101.

A third gusset 402 can be disposed between the first stop 414 and the bar 100. A fourth gusset 404 can be disposed between the second stop 416 and the bar 100. A fifth gusset 418 can be disposed between the first side support 62 and the first stop 414. A sixth gusset 420 can be disposed between second side support 63 and the second stop 416. The gussets can be right triangle shaped hollow aluminum channel.

The frame 15 can have a first handle 40a and a second handle 40b, allowing an operator to easily move and transport the portable motorized racking tool 6. The handles 40a-40b can be ones available from Bosch Rexroth of Germany. The handles 40a-40b can be plastic or plastic and metal, and can be capable of supporting the entire weight of the portable motorized racking tool 6 without deforming. The weight of the portable motorized racking tool 6 can range from about 30 pounds to about 45 pounds.

The frame 15 can also include one or more top channels 432a and 432b. The top channels 432a and 432b can reduce the weight of the portable motorized racking tool 6.

The frame 15 can have one or more side channels on each side support 62 and 63, such as the first side channel 434a on the first side support and the second side channel 436b on the second side support 63.

A first magnetic support 424 can be connected to the first side support 60. A first removable magnetically shielding magnet housing 36a can be disposed over the first magnetic support 424 and the first side support 62, and can be slidably engaged within one or more channels of the first side support 62, such as the first side channel 434a and/or the top channel 432a.

The first removable magnetically shielding magnet housing 36a can contain an extendable and retractable magnet 32 which can be rotated and positioned inside and outside of the first removable magnetically shielding magnet housing 36a using a first magnet handle 33a.

A second magnetic support 426 can be engaged with the second side support 63. The second magnetic support 426 can also support a removable magnetically shielding magnet housing (not shown).

The first and second magnetic supports 424 and 426 can be from about 4 inches to about 6 inches long, from about ⅛ of an inch to about ¼ of an inch wide, and made of solid aluminum or solid stainless steel.

In operation, a user can magnetically attach the portable motorized racking tool 6 to the metal surface 4 by turning the first magnet handle 33a to engage the extendable and retractable magnet 32 with the metal surface 4. Similarly, the user can turn a second magnetic handle to engage a second extendable and retractable magnet with the metal surface, forming a flush and secure engagement.

A torque limiting clutch 18 can operatively engage the gear box 13. A coupling (not shown) can connect to the torque limiting clutch 18 for engaging a circuit breaker or other portion of the electrical equipment 5 for installation or removal. The torque limiting clutch 18 can be one available from Perf-A-Torque of Massachusetts.

The operator can send power and control signals to the portable motorized racking tool 6 from a remote location, such as by using a remote control device wirelessly connected to a remote switch operator that is in a wired connection with the portable motorized racking tool 6. For example, the remote switch operator can be wired to a motor control housing 38 through an interface plug 50.

The motor control housing 38 can be in communication with the motor 12 through a signal and power cord 17. The signal and power cord 17 can transmit electricity and signals from the remote switch operator to the motor 12.

The motor 12 can actuates a gear assembly of the gear box 13. The gear box 13 can actuate the torque limiting clutch 18. The torque limiting clutch 18, along with a coupling attached to it, can rotate the electrical equipment 5 to either install or remove the electrical equipment 5.

Figure 2:
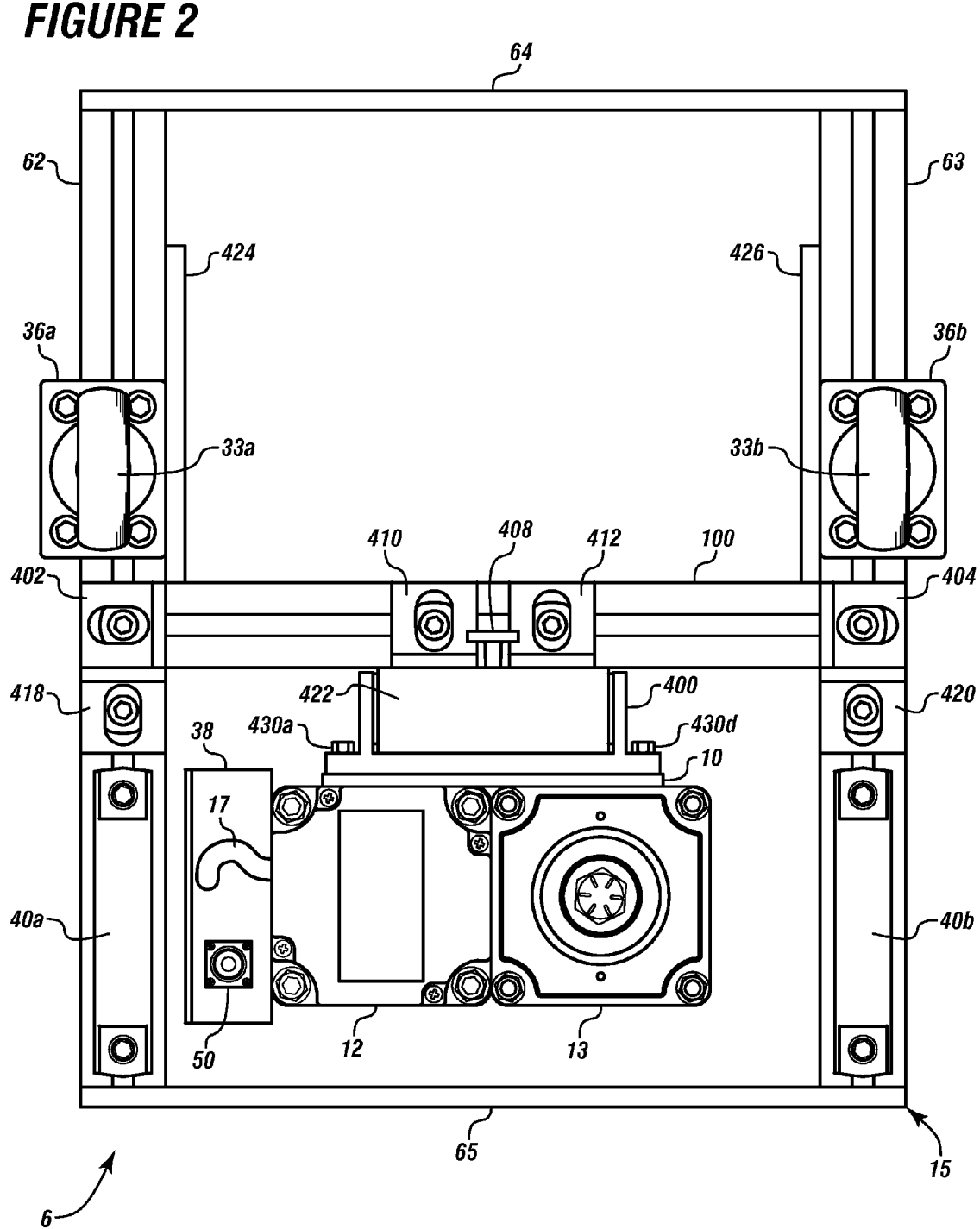
FIG. 2 depicts a top view the portable motorized racking tool.

FIG. 2 depicts a top view of the portable motorized racking tool 6. The portable motorized racking tool 6 can have the frame 15, the motor 12, the gear box 13, the first removable magnetically shielding magnet housing 36a, the first magnet handle 33a, a second removable magnetically shielding magnet housing 36b, a second magnet handle 33b, the motor control housing 38, the interface plug 50, and the signal and power cord 17.

The gear box 13 can connect to the motor control housing 38. The gear box can be a part number 200FR available from Oriental Motors USA Corp. of Los Angles, Calif.

The frame 15 is depicted with the first side support 62, the second side support 63, the first beam 64, the second beam 65, the first magnetic side support 424, the second magnetic side support 426, the first gusset 410, the second gusset 412, the third gusset 402, the fourth gusset 404, the fifth gusset 418, the sixth gusset 420, the first handle 40a, the second handle 40b, and the bar 100.

The one or more fasteners 430a and 430b can provide engagement between the sliding motor bracket 400 and the motor arm having the cover 422. The one or more fasteners 430a and 430b can be engaged with a motor mount plate 10. The one or more fasteners 430a and 430b can be threaded rods with nuts or bolts and nuts, or another type of removable fastener.

The sliding motor bracket 400 can be from about 4 inches to about 8 inches in length, and from about 3 inches to about 6 inches in width. The sliding motor bracket 400 can be made of an extruded hollow aluminum channel. The sliding motor bracket 40 can have at least one channel per side.

An advantage of the portable motorized racking tool 6 is that the it can be completely modular and reconfigurable, allowing for at least partial reconfiguration for operation on similar sized electrical equipment.

A locking device 408 can be connected to the motor arm. In operation, the locking device 408 can be used to operate a spring to apply a pressure towards the motor 12 to form a connection between a coupling and the electrical equipment. The locking device 408 can be one available from CBS Arc-Safe, Inc. of Denton, Tex.

Figure 3:
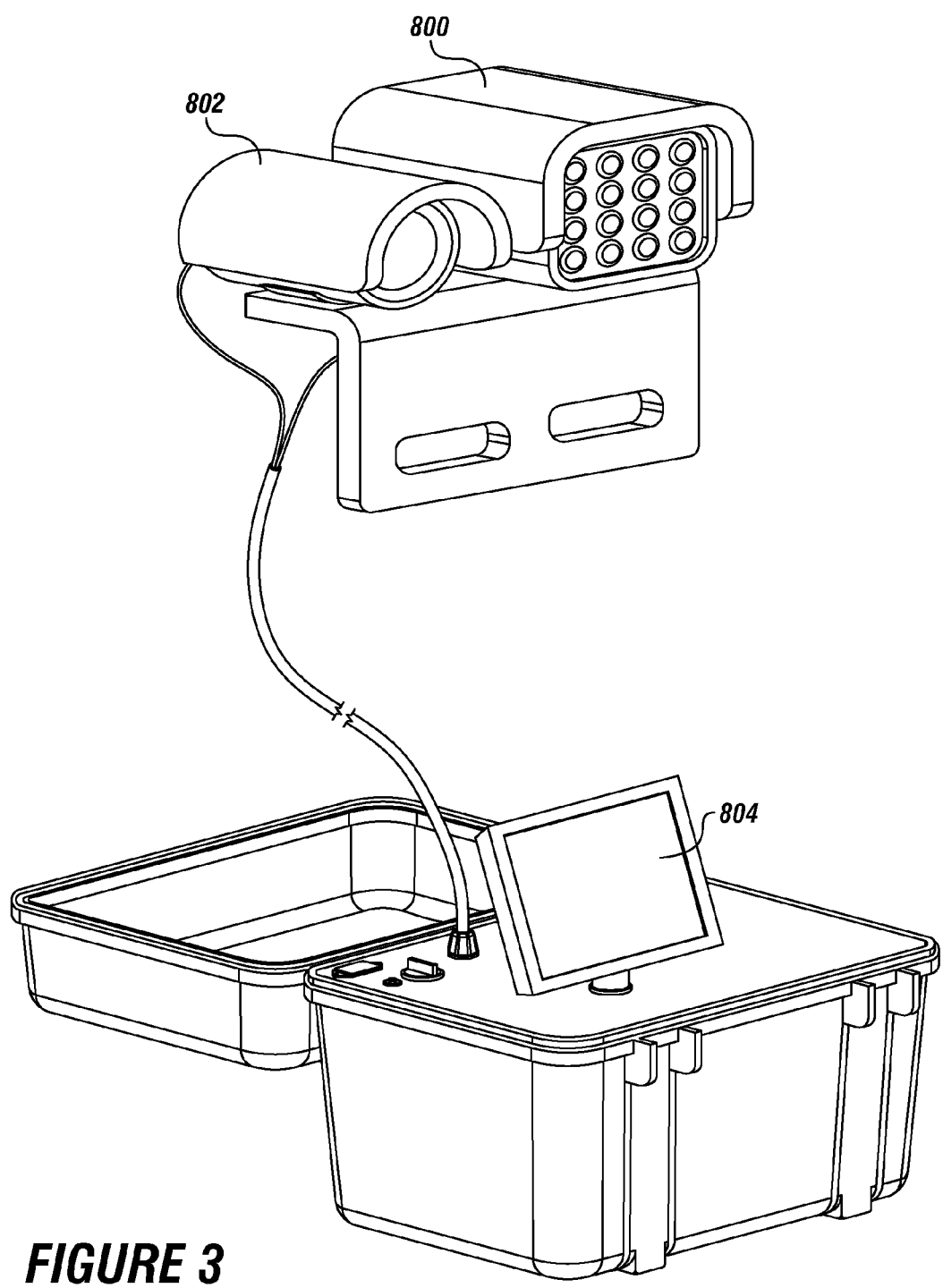
FIG. 3 depicts an embodiment of a camera, a light, and a monitor that can be used with the portable motorized racking tool.

FIG. 3 depicts an embodiment of a camera 802 and a light 800. The camera 802 and the light 800 can be disposed proximate the portable motorized racking tool and can be used to capture images and or video thereof.

The camera 802 can be in communication with a monitor 804. In operation, a user can view the captured images and/or video remotely on the monitor 804 during installation and/or removal of the electrical equipment while the operator is outside of the arc flash zone.

FIGS. 4A-4B depict an embodiment of the sliding motor bracket having a sliding motor bracket back 450.

The sliding motor bracket can have a sliding motor bracket first side wall 452 and a sliding motor bracket second side wall 454, which can both connect to the sliding motor bracket back 450 and extend perpendicularly from the sliding motor bracket back 450.

The sliding motor bracket back 450 can have a plurality of first mounting holes 456*a*, 456*b*, 456*c*, and a plurality of second mounting holes 458*a*, 458*b*, and 458*c*, which can all be used to mount the sliding motor bracket back 450 to the motor mount plate. Fasteners (not shown) can be installed through the plurality of first and second mounting holes.

One or more inserts can be mounted to the sliding motor bracket. A first insert 462*a* can be mounted to the sliding motor bracket back 450. The first insert 462*a* can include insert mounting holes 460*a*, 460*b*, and 460*c*.

The sliding motor bracket back 450 can have mounting holes that correspond with the insert mounting holes 460*a*, 460*b*, and 460*c* for attaching the first insert 462*a* to the sliding motor bracket back 450.

The sliding motor bracket back 450 can have a plurality of third mounting holes 464*a*, 464*b*, 464*c*, 464*d*, 464*e*, and 464*f* on the sliding motor bracket first side wall 452 and the sliding motor bracket second side wall 454. The plurality of third mounting holes 464*a*-464*f* can be used to attach the second insert 462*b* and the third insert 462*c* to the sliding motor bracket.

Figure 5:
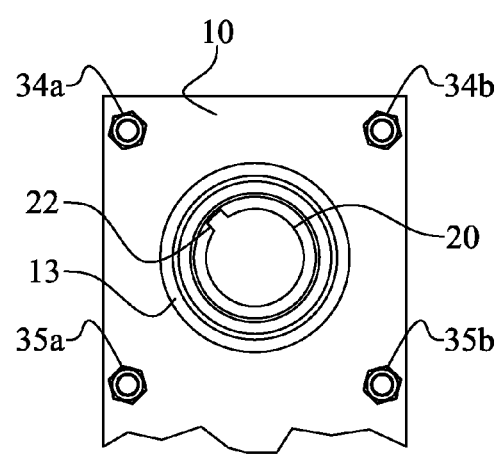
FIG. 5 depicts a gear box with a shaft housing.

FIG. 5 depicts an embodiment of the motor mount plate 10 with motor mount fasteners 34*a*, 34*b*, 35*a*, and 35*b* for securing the motor mount plate 10 to the gear box 13. The gear box 13 can have a shaft housing 20 with a gear box keyway 22.

Figure 6:
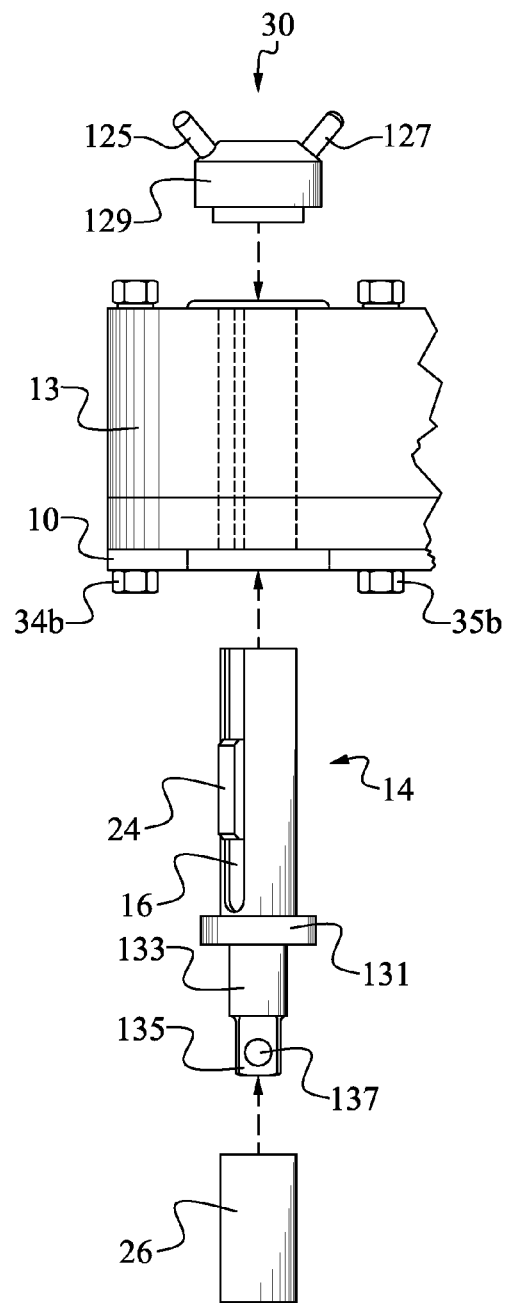
FIG. 6 depicts a gear assembly.

FIG. 6 depicts the coupling 26 that can engage electrical equipment. Referring to both FIG. 5 and FIG. 6, the coupling 26 can be operatively engaged with the rotatable shaft 14. For example the coupling 26 can engage an extension 135 of a collar 133 having a locking mechanism 137 and a stop 131. The extension 135 can have a length from about ½ of an inch to about 1 inch. The collar can have a length from about ½ of an inch to about 1 inch. The stop can have a diameter from about ½ of an inch to about 1 inch. The extension 135 can be square shaped. The collar 133 can be circular. The stop 131 can have a diameter about 25 percent larger than the diameter of the collar 133.

The coupling 26 can have a diameter that corresponds to the circuit breaker, and a length from about 1 inch to about 12 inches.

The rotatable shaft 14 can have a shaft keyway 16 with a key 24. The shaft keyway 24 can be up to about 70 percent the length of the rotatable shaft 14. The key 24 can have a length ranging from about ½ of an inch to about 1 inch, and a thickness of about ⅛ of an inch to fit into the shaft keyway 16.

The rotatable shaft 14 can engage the shaft housing 20, and the key 24 can engage the gear box keyway 22.

The gear box 13 can operatively engage the rotatable shaft 14 for rotating the rotatable shaft 14 for installing and/or removing electrical equipment.

The gear assembly 30 can include an alignment tool 129 with a first wing 125 and a second wing 127.

In operation, the alignment tool 129 can be engaged with the rotatable shaft 14 within the gear box 13, and the wings 125 and 127 can be used to rotate the rotatable shaft 14 to align the coupling 26 with a portion of electrical equipment.

Also depicted is the motor mount plate 10 engaged with the motor mount fasteners 34*b* and 35*b*.

Figure 7:
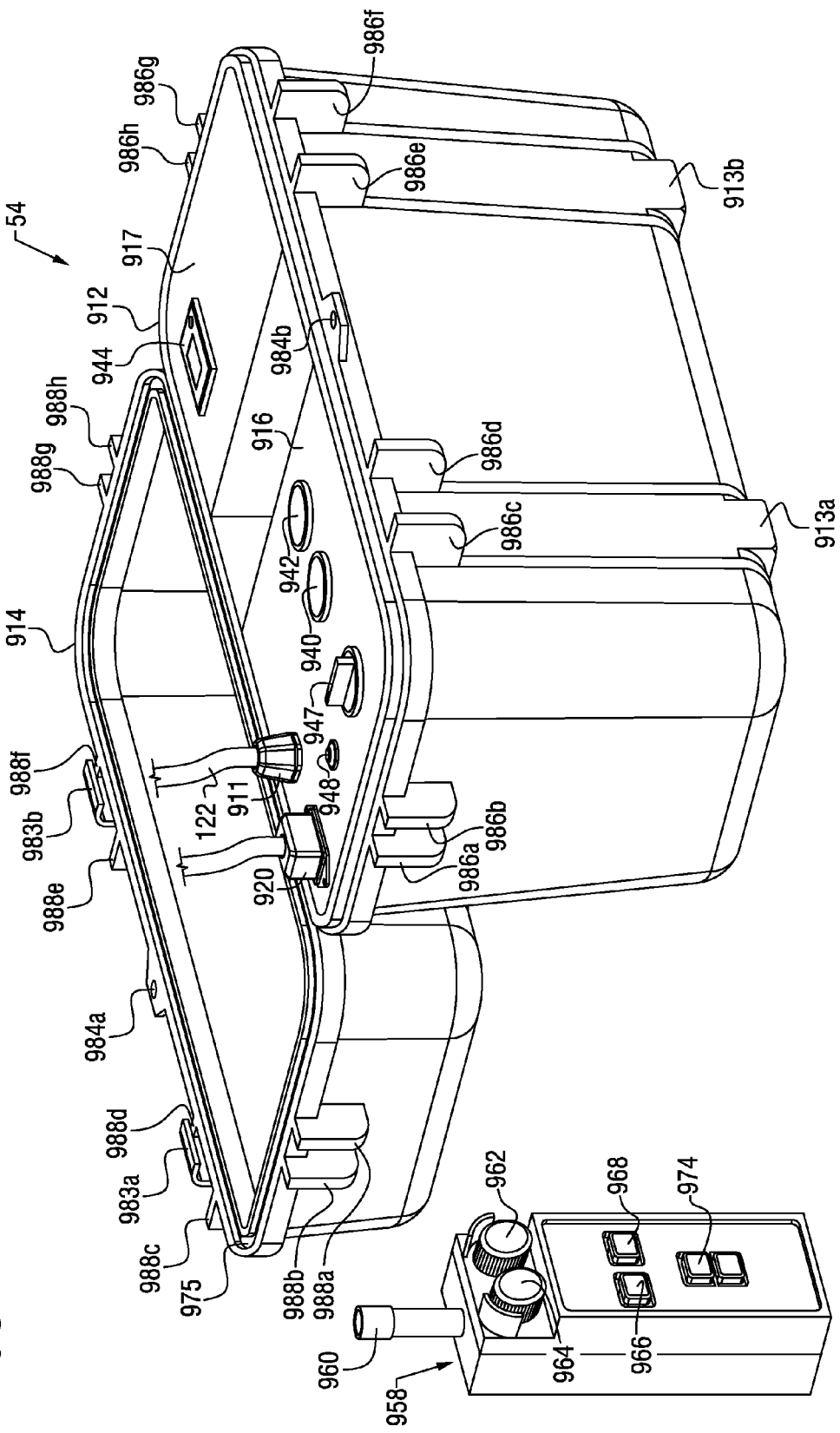
FIG. 7 depicts an embodiment of a remote switch operator.

FIG. 7 depicts an embodiment of a remote switch operator 54. The remote switch operator 54 can be used to remotely operate the portable motorized racking tool. The remote switch operator 54 can have a body 912 and a lid 914, which can be opened and closed over the body 912.

The body 912 can have one or more body ribs 986*a*, 986*b*, 986*c*, 986*d*, 986*e*, 986*f*, 986*g*, and 986*h* that can provide support for the body 912.

The body 912 can have one or more feet 913*a* and 913*b* that can provide clearance from the ground if the housing is placed near water or other substances.

The lid 914 can have one or more lid ribs 988*a*, 988*b*, 988*c*, 988*d*, 988*e*, 988*f*, 988*g*, and 988*h* that can provide support to the lid 914.

The lid 914 can have one or more latches 983*a* and 983*b* that can be used to hold the lid 914 to the body 912.

Connectors 984*a* and 984*b* can be used to lock the lid 914 to the body 912.

The lid 914 can have a groove 975 that can retain a sealing member, such as an elastomeric gasket, to provide a sealed engagement between the lid 914 and the body 912.

A first face plate 916 and a second face plate 917 can be mounted within the body 912.

The first face plate 916 can have a remove momentary push button 942, an install momentary push button 940, an on/off switch 947, and a circuit breaker 948.

The first face plate 916 can also have a power plug 920, and a power and signal plug 911 in communication with a power cord 122. The power and signal plug 911 can transmit power and signals from the remote switch operator 54 to the portable racking tool.

The second face plate 917 can support a current control module 944.

A remote control device 958 with a remote off-button 964, a remote on-button 962, a remote install button 966, a remote remove button 968, an automatic shut off switch 974, and an antenna 960 can be used by operators to remotely control the remote switch operator 54 and the portable racking tool outside of an arc flash zone.

The automatic shut off switch 974 can disable the portable racking tool when the portable racking tool exceeds a preset amperage.

Figure 8:
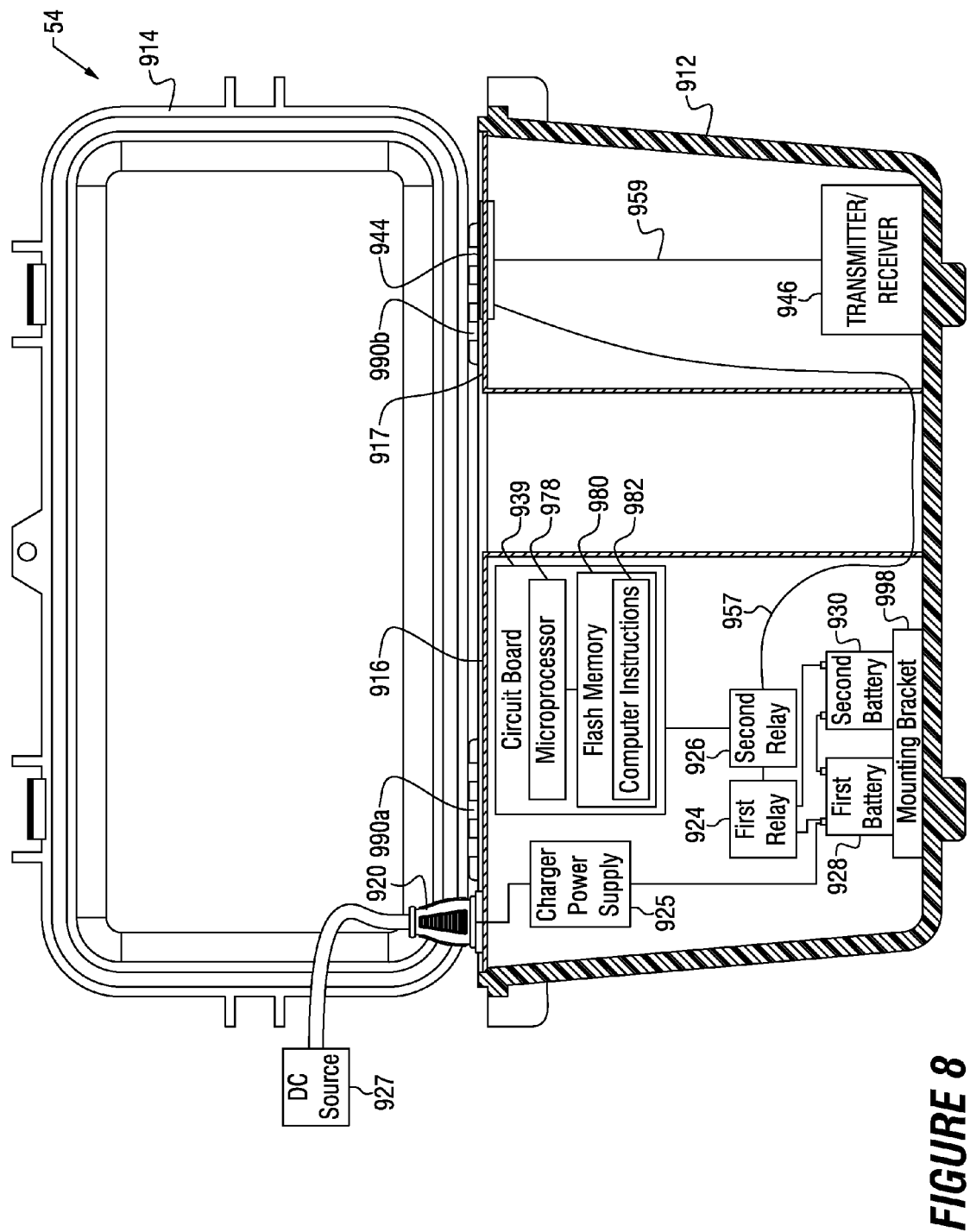
FIG. 8 depicts a cut view of the remote switch operator.

FIG. 8 depicts a cutaway view of the remote switch operator 54. The lid 914 is depicted opened relative to the body 912 with one or more hinges 990*a* and 990*b*.

A transmitter/receiver 946 can transmit or receive signals from the remote control device, which can be a radio controller. The transmitter/receiver 946 can be in communication with the current control module 944 on the second plate 917 through a first cable 959.

The current control module 944 can be in communication with a second relay 926 through a second cable 957. As such, the current control module 944 can send electricity and signals from the transmitter/receiver 946 to the second relay 926.

The second relay 926 can be in communication with a circuit board 939. The circuit board 939 can have a microprocessor 978, and a flash memory 980 with computer instructions 982.

The second rely 946 can send electricity and signals from the transmitter/receiver 946 to the circuit board 939. The circuit board 939 can control the various electrical components under the first face plate 916. For example, the circuit board 939 can control the buttons on the first face plate 916, such as for increasing or decreasing an amperage.

In one or more embodiments, the computer instructions 982 can provide instructions to monitor the current passing through the remote switch operator 54. The computer instructions 982 can also contain preset amperage limits for automatic shut off of the motor on the portable racking tool.

The second relay 926 can be in communication with a first relay 924. The second rely 946 can send electricity and signals from the transmitter/receiver 946 to the first relay 924.

The first relay 924 can be in communication with a first battery 928 and a second battery 930 for sending electricity and signals from the transmitter/receiver 946 to the first battery 928 and the second battery 930. The first battery 928 and the second battery 930 can be in communication with each other, and can both be mounted to a mounting bracket 998.

The first battery 928 can be in communication with a charger power supply 925, which can be in communication with a DC source 927 through the power plug 920 for providing up to 27 volts to charge the first battery 928 and the second battery 930. The first battery 928 and the second 930 can be 12 volt batteries.

Figure 9:
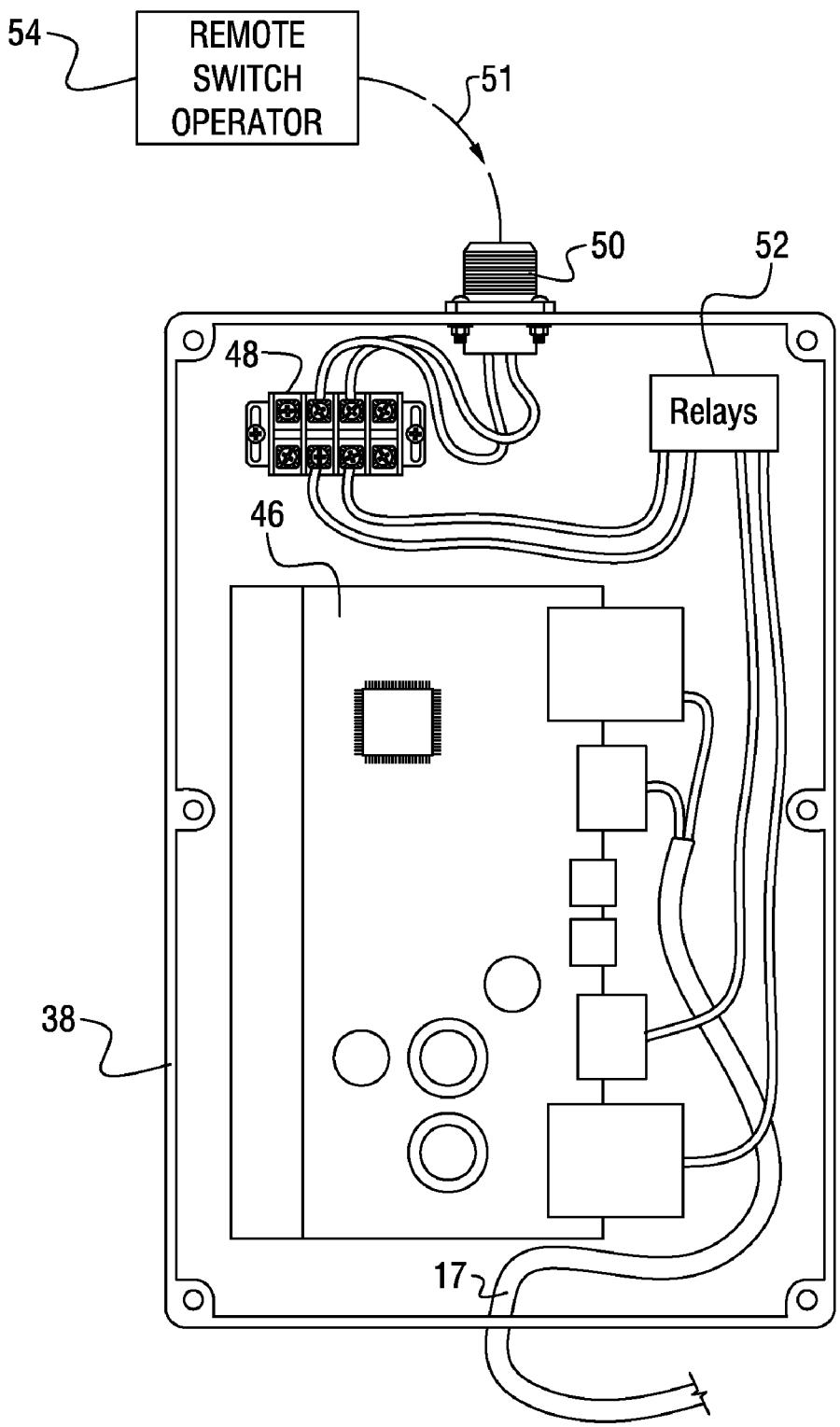
FIG. 9 depicts a motor control housing.

FIG. 9 depicts an embodiment of the motor control housing 38, which can be made of aluminum or another lightweight metal alloy.

The motor control housing 38 can have a back, four sides, and a removable top, which can be connected together. The motor control housing 38 can be a Hammond electronics box available from Allied Electronics of Fort Worth, Tex.

The motor control housing 38 can receive the power and control signals 51 from a power supply, which can be the remote switch operator 54.

The power and control signals 51 from the remote switch operator 54 can be received through the interface plug 50.

Current can flow from the interface plug 50, through the electrical connectors 48, through the motor relays 52, and to the motor control circuit board 46.

The signal and power cord 17 can communicate the power and control signals 51 from the motor control circuit board 46 to the motor.

Figure 10:
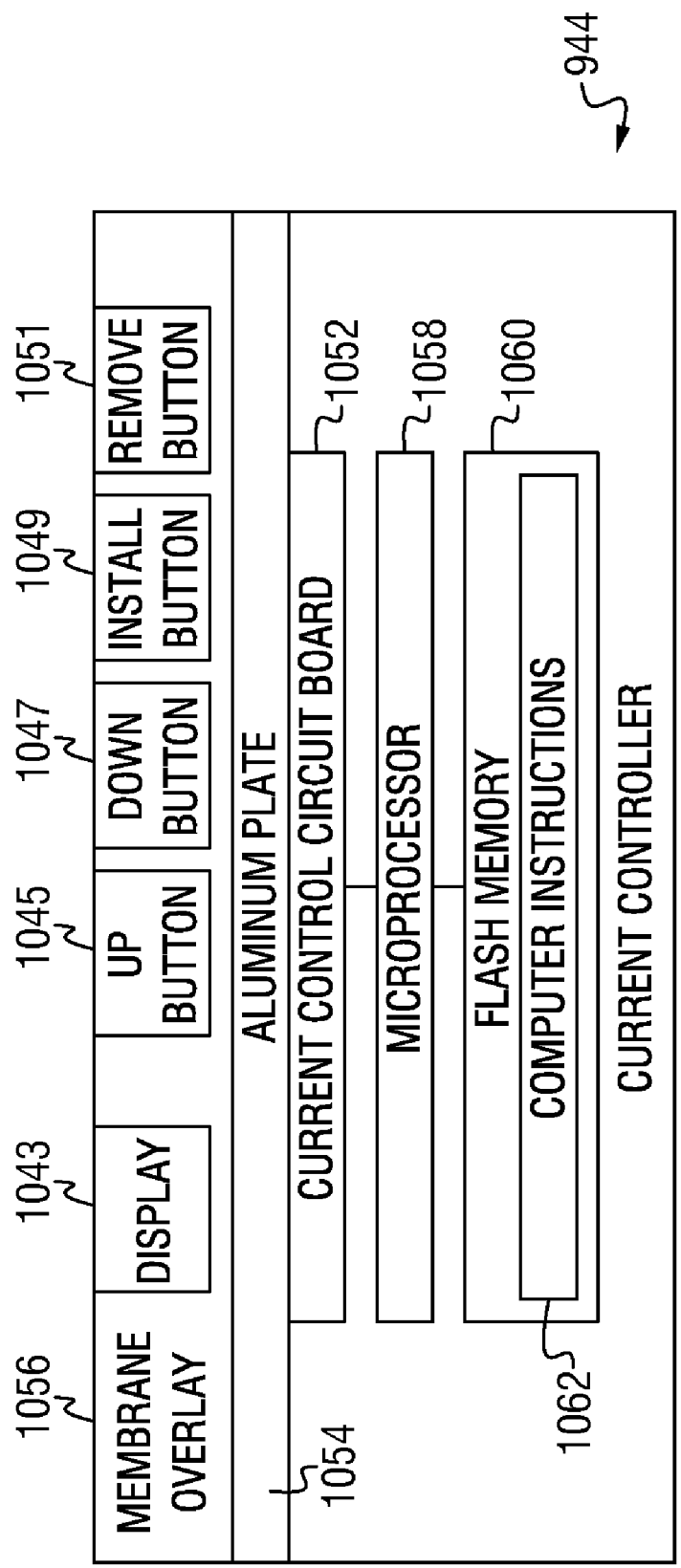
FIG. 10 depicts a diagram of the electronics of a current controller.

FIG. 10 is a diagram of electronics of a current controller 944. A membrane overlay 1056 can be disposed over an aluminum plate 1054.

The membrane overlay 1056 can have a display 1043 and four engagement positions, including an up button 1045, a down button 1047, an install button 1049, and a remove button 1051.

The membrane overlay 1056 can have a current control circuit board 1052.

A microprocessor 1058 can be in communication with the current control circuit board 1052, and with a flash memory 1060 having computer instructions 1062.

The up button 1045 can allow the current controller 944 to increase a predefined amp setting to control when the motor is automatically turned on by the current controller 944.

The down button 1047 can allow the current controller 944 to decrease the predefined amp setting to control when the motor is automatically shut down by the current controller 944.

The install button 1049 can permit the current controller 944 to set an amount of current needed to install the electrical equipment, such as 23 amps.

The remove button 1051 can allow the current controller 944 to set an amount of current needed to remove the electrical equipment, such as 19 amps.

Figure 11:
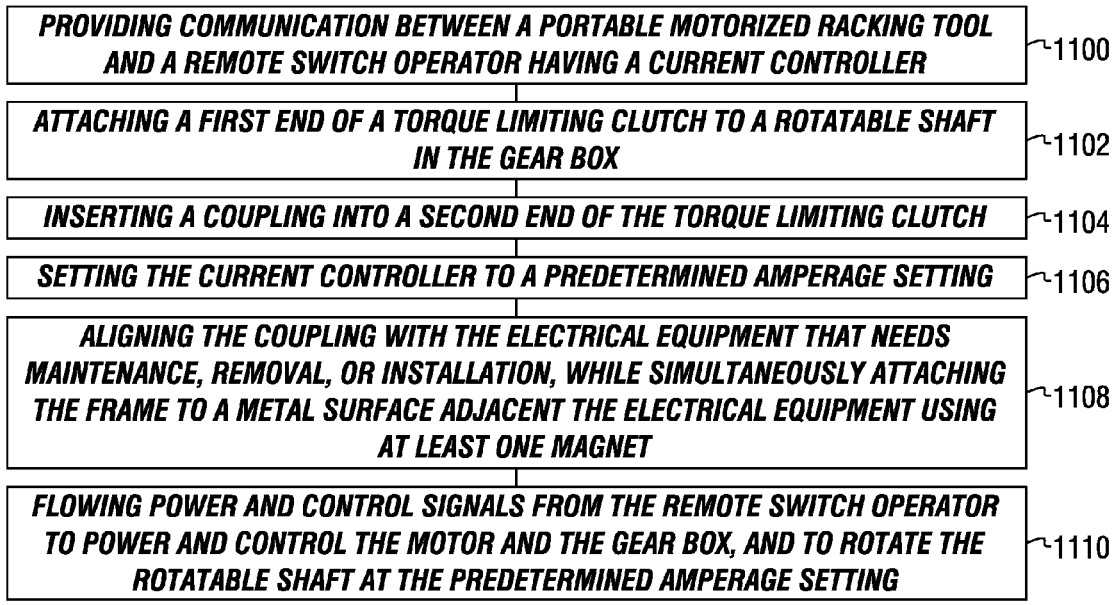
FIG. 11 depicts an embodiment of a method for removing or installing electrical equipment.

FIG. 11 depicts an embodiment of a method for racking electrical equipment.

The method can include providing communication between a portable motorized racking tool and a remote switch operator having a current controller, as illustrated by box 1100.

The method can include attaching a first end of a torque limiting clutch to a rotatable shaft in the gear box, as illustrated by box 1102.

The method can include inserting a coupling into a second end of the torque limiting clutch, as illustrated by box 1104.

The method can include setting the current controller to a predetermined amperage setting, as illustrated by box 1106.

The method can include aligning the coupling with the electrical equipment that needs maintenance, removal, or installation, while simultaneously attaching the frame to a metal surface adjacent the electrical equipment using at least one magnet, as illustrated by box 1108.

The method can include flowing power and control signals from the remote switch operator to power and control the motor and the gear box, and to rotate the rotatable shaft at the predetermined amperage setting, as illustrated by box 1110.

While these embodiments have been described with emphasis on the embodiments, it should be understood that within the scope of the appended claims, the embodiments might be practiced other than as specifically described herein.

What is claimed is:

1. A portable motorized racking tool for removing or installing electrical components for electrical equipment surrounded by a metal surface by an operator outside an arc flash hazard boundary, wherein the portable motorized racking tool comprises:
   a. a frame comprising:
      (i) a first side support and a second side support opposite the first side support;
      (ii) a first beam disposed between the first side support and the second side support, and a second beam disposed between the first side support and the second side supports opposite the first beam; and
      (iii) a first stop connected to the first side support, a second stop connected to the second side support, and a bar mounted between the first stop and the second stop;
   b. a motor arm extending perpendicular from the bar, wherein the motor arm is supported by a first gusset and a second gusset;
   c. a locking device disposed on the motor arm configured to operatively engage a spring to apply pressure to maintain a connection between a coupling and the electrical equipment to be operated upon;

d. a sliding motor bracket connected to the motor arm configured to maintain the coupling with the electrical equipment at a predetermined distance from the frame;
e. a first magnetic support slidably attached to the first side support;
f. at least one removable magnetically shielding magnet housing slidingly connected to the first magnetic support and over the first side support;
g. an extendable and retractable magnet having a magnet handle disposed within each removable magnetically shielding magnet housing, wherein the extendable and retractable magnet is configured to magnetically connect the frame flush to the metal surface surrounding the electrical equipment;
h. a motor with a gear box, wherein the motor is in communication with a motor control housing through a signal and power cord, and wherein the motor control housing has an interface plug in communication with a remote switch operator having a remote control device for controlling the remote switch operator for receiving power and control signals therefrom;
i. a rotatable shaft with a shaft keyway and a key connected to the gear box, wherein the gear box has a shaft housing with a gear box keyway, wherein the rotatable shaft is engaged with the shaft housing, and wherein the key is engaged with the gear box keyway;
j. a torque limiting clutch connected to the rotatable shaft and the coupling; and
k. an alignment tool engaged with the rotatable shaft, wherein the alignment tool is configured to rotate the coupling to align the coupling with the electrical equipment.

2. The portable racking tool of claim 1, wherein the motor arm further comprises a top motor arm channel slidably engaged with the first gusset and the second gusset.

3. The portable racking tool of claim 2, further comprising:
a. a third gusset connected to the first stop;
b. a fourth gusset connected to the second stop;
c. a fifth gusset connected to the first stop and the first side support; and
d. a sixth gusset connected to the second stop and the second side support.

4. The portable racking tool of claim 1, further comprising a cover disposed over the motor arm opposite the bar.

5. The portable racking tool of claim 1, wherein the first side support and the second side support each have an inside support channel, and wherein the magnetic support slidably engages with one of the inside support channels.

6. The portable racking tool of claim 1, wherein the first side support and the second side support are connected to the first beam and the second beam with frame fasteners.

7. The portable racking tool of claim 1, wherein the first beam, the second beam, the first side support, and the second side support are hollow.

8. The portable racking tool of claim 1, wherein the sliding motor bracket comprises:
a. a sliding motor bracket back;
b. a sliding motor bracket first side wall connected to the sliding motor bracket back;
c. a sliding motor bracket second side wall connected to the sliding motor bracket back;
d. a plurality of first mounting holes disposed in the sliding motor bracket back;
e. a plurality of second mounting holes disposed in the sliding motor bracket back opposite the plurality of first mounting holes;
f. a plurality of third mounting holes disposed in the sliding motor bracket back between the sliding motor bracket first side wall and the sliding motor bracket second side wall;
g. a first insert disposed on the sliding motor bracket back between the sliding motor bracket first side wall and the sliding motor bracket second side wall, wherein the plurality of third mounting holes are configured to receive fasteners to hold the first insert to the sliding motor bracket;
h. a second insert on the sliding motor bracket first side wall adjacent the first insert;
i. a third insert disposed on the sliding motor bracket second side wall adjacent the first insert; and
j. a plurality of insert mounting holes disposed in the sliding motor bracket first side wall and the sliding motor bracket second side wall, wherein the plurality of insert mounting holes are configured to receive fasteners to hold the second insert and the third insert to the sliding motor bracket.

9. The portable racking tool of claim 8, wherein the first insert, the second insert, and the third insert are each one-piece C-shaped structures made of a polyamide, a non-deforming plastic, a Teflon™ coated material configured to provide a frictionless engagement, or a coated graphite liner configured to provide a non-tearing frictionless engagement.

10. The portable racking tool of claim 1, further comprising at least one handle mounted to the frame.

11. The portable racking tool of claim 1, wherein the bar comprises a bar front channel slidably engaged with the motor arm.

12. The portable motorized racking tool of claim 1, wherein the first beam, the second beam, the first side support, the second side support, or combinations thereof are made of aluminum.

13. The portable motorized racking tool of claim 1, further comprising a camera with a light in communication with a monitor allowing for remote viewing by a user.

14. The portable motorized racking tool of claim 1, further comprising a second magnet support slidably attached to the second side support for slidably supporting a second removable magnetically shielding magnetic housing with a second extendable and retractable magnet and a second magnet handle.

15. The portable motorized racking tool of claim 1, wherein the alignment tool comprises at least one wing configured to rotate the rotatable shaft and align the coupling with the electrical equipment to be installed, removed, or maintained.

16. The portable motorized racking tool of claim 1, wherein the remote switch operator comprises:
a. a body and a closable lid;
b. a first face plate within the body, wherein the first face plate comprises a power plug, an install momentary push button, a remove momentary push button, an on-off switch, and a circuit breaker;
c. a charger power supply connected to the power plug;
d. a circuit board beneath the first face plate engaged with two relays, wherein the two relays are engaged with at least one battery, wherein the at least one battery is connected to a battery charger through the power plug for receiving power from a power source to charge the at least one battery, and wherein the circuit board comprises a microprocessor with a flash memory and computer instructions to monitor current;
e. a second face plate within the housing adjacent the first face plate, wherein the second face plate comprises a current controller, and wherein the current controller is in communication with at least one of the two relays;

f. an interface cable configured to send signals between the current controller and a transmitter/receiver in the body; and g. a remote controller in wireless or wired communication with the transmitter/receiver for remotely actuating the remote switch operator, thereby actuating the portable motorized racking tool, wherein the remote controller has an antennae, an on switch, an off switch, an install switch, a remove switch, and an automatic shut off switch.

17. The portable motorized racking tool of claim 1, wherein the electrical equipment is a low voltage circuit breaker using up to 1000 volts, a medium voltage circuit breaker using from 1000 volts to 20000 volts, a switch gear, a motor control center, or a contactor.

18. The portable motorized racking tool of claim 1, wherein the motor control housing comprises relays and a motor control circuit board configured to operate the motor and the gear box using the signal and power cord.

19. A method for racking electrical equipment comprising:

a. providing communication between a portable motorized racking tool and a remote switch operator having a current controller, wherein the portable motorized racking tool comprises a frame, a motor, a gear box with a gear assembly, and a motor controller;

b. attaching a first end of a torque limiting clutch to a rotatable shaft in the gear box;

c. inserting a coupling into a second end of the torque limiting clutch;

d. setting the current controller to a predetermined amperage setting;

e. aligning the coupling with the electrical equipment that needs maintenance, removal, or installation, while simultaneously attaching the frame to a metal surface adjacent the electrical equipment using at least one magnet; and f. flowing power and control signals from the remote switch operator to power and control the motor and the gear box to rotate the rotatable shaft at the predetermined amperage setting.

* * * * *